United States Patent [19]

Pilato

[11] Patent Number: 5,190,802
[45] Date of Patent: Mar. 2, 1993

[54] BALLISTIC RESISTANT LAMINATE

[76] Inventor: Louis A. Pilato, 598 Watchung Rd., Bound Brook, N.J. 08805

[21] Appl. No.: 293,995

[22] Filed: Jan. 6, 1989

[51] Int. Cl.⁵ .............................................. B32B 5/12
[52] U.S. Cl. .................................. 428/111; 156/306.6; 156/306.9; 428/105; 428/109; 428/110; 428/284; 428/287; 428/911; 428/247
[58] Field of Search ............... 428/911, 251, 252, 109, 428/110, 111, 105, 284, 247, 287; 156/306.6, 306.9

[56] References Cited

U.S. PATENT DOCUMENTS

| | | | |
|---|---|---|---|
| 3,084,085 | 4/1963 | Ronay | 428/911 |
| 3,801,416 | 4/1974 | Gulbierz | 161/36 |
| 3,904,455 | 9/1975 | Goldman | 156/62.4 |
| 3,924,038 | 12/1975 | McArdle et al. | 428/49 |
| 4,181,768 | 1/1980 | Severin | 428/252 |
| 4,428,998 | 1/1984 | Hawkinson | 428/240 |
| 4,522,871 | 1/1985 | Armellino et al. | 428/911 |
| 4,539,253 | 9/1985 | Hirschbuehler et al. | 428/229 |
| 4,550,044 | 10/1985 | Rosenberg et al. | 428/911 |
| 4,574,105 | 3/1986 | Donovan | 428/233 |
| 4,623,574 | 11/1986 | Harpell et al. | 428/911 |
| 4,639,387 | 1/1987 | Epel | 428/113 |
| 4,678,702 | 7/1987 | Lancaster et al. | 428/252 |
| 4,738,893 | 4/1988 | Grille | 428/252 |
| 4,812,359 | 3/1989 | Hall | 428/911 |

OTHER PUBLICATIONS

R. C. Laible, Fibrous Armor p. 107.
Technical Report Natick/TR-84/030, Jun. 1984.

*Primary Examiner*—James J. Bell
*Attorney, Agent, or Firm*—Bernard Francis Crowe

[57] ABSTRACT

Improved ballistic resistant laminates have been developed by bonding alternating plies of fabric woven from glass or normally solid organic polymers and non-woven scrim prepreg impregnated with a heat curable resin. A preferred organic polymer is an aramid exemplified by Kevlar. A preferred heat curable resin is phenol-formaldehyde/polyvinyl butyral blend.

22 Claims, 1 Drawing Sheet

BALLISTIC RESISTANT LAMINATE

This invention relates to ballistic protection and more particularly to ballistic resistant fabric laminates.

BACKGROUND OF THE INVENTION

High modulus fibers have been used in the production of ballistic articles and high performance composites. Examples include aramid fibers, graphite fibers, glass fibers, nylon fibers, high modulus polyethylene fibers and the like. Woven fabric from such fibers can be impregnated with heat curable resins and fabricated into shaped composites alone or in combination with other materials.

Hard laminate plates of fiberglass coated with polyester resins have been inserted into pockets of nylon jackets for body armor. Fiberglass alone has poor impact and ballistic resistance. A composite or laminate of these two materials however has high impact and ballistic resistance (Ballistic Materials and Penetration Mechanics, R. C. Laible, page 102, Elsevier Scientific Publishing Co., New York, 1980). Other resins that have been considered include polystyrene, polystyrene-polyester copolymers, polymethyl methacrylate, melamine-formaldehyde and thermosets, such as, Laminac (a trademark of American Cyanamid).

Different types of glass with varying moduli were compared including E-glass, LMLD (low modulus, low density glass), S-glass and D-glass (dielectric glass). These glasses differed in the content of calcium oxide, aluminum oxide, boron oxide, sodium oxide, potassium oxide and lead oxide.

The helmet liner insert for the classical steel helmet of World War II is a laminate of nylon fabric and a phenolic modified polyvinyl butyral resin.

A report by A. L. Alesi et al. in Army Sci. Conf. Proc., I, page 18 (1974) compared flat laminates of Kevlar fabric and phenolic polyvinylbutyral resin with laminates of LMLD fiber; XP (a highly oriented polypropylene film) and a composite of glass reinforced plastic (GRP), XP and Kevlar.

U.S. Pat. No. 4,639,387 monofilament fibers coated with a curable resin and wound on a mandrel into a plurality of layers are consolidated under heat and pressure to a unitary body.

U.S. Pat. No. 4,181,768 discloses a laminate for body armor of alternating layers of Kevlar and 6,6 nylon film bonded by heat.

U.S. Pat. No. 4,678,702 discloses a laminate of at least nine layers of Kevlar fabric and Surlyn heated to a point where the Surlyn flows into and encapsulates the Kevlar yarn.

U.S. Pat. No. 3,801,416 teaches the use of blast-resistant plates embedded in a plurality of layers of flexible blast-resistant material.

U.S. Pat. No. 3,924,038 describes a ballistic shield-protective system including ballistic nylon felt layers enclosed within a surface of ceramic or tile mounted on glass cloth and metal back plate.

U.S. Pat. No. 3,904,455 discloses a laminated fabric comprising a woven or knotted web of textile fibers reinforced by a backing of a spun bonded non-woven web.

U.S. Pat. No. 4,428,998 discloses a laminated missile shield of multiple layers of resin impregnated aramid fiber woven fabric in a rubbery matrix.

U.S. Pat. No. 4,574,105 shows a penetration resistant panel comprising plied layers of interwoven textile yarn of poly(p-phenylene terephthalamide) backed with plied layers of woven or non-woven fibers of 6,6 nylon.

U.S. Pat. No. 4,539,253 discloses prepreg fabrics comprised of a first layer of reinforced fabric coated with an epoxy resin modified with an elastomeric polymer having high impact resistance.

U.S. Pat. No. 4,738,893 provides a fiber-based structure from a plurality of layers of organic aromatic polyamide fibers bonded with intermediate layers of elastomer.

Despite the plethora of devices for ballistic protection in the prior art, there is a continuing need for more economical ones.

SUMMARY OF THE INVENTION

It is an object of this invention to provide a ballistic resistant laminate combining economy with improved ballistic performance.

This object has been achieved by a laminate comprising alternating plies of uncoated woven fabric bonded to alternating plies of non-woven scrim prepreg through a heat curable resin contained in said prepreg wherein said fabric is woven from filaments of glass or at least one normally solid organic polymer having:

(a) a tensile modulus of at least about 20 g/denier;

(b) a tensile strength of at least about 400,000 psig; and (c) an areal density at least about 0.5 lb/ft$^2$ and said scrim comprises filaments of natural or synthetic fibers impregnated with a thermosetting resin.

The preferred organic polymer is an aramid, such as Kevlar, a trademark of du Pont for poly(p-phenylene terephthalamide) although others, such as Twaron, an aramid sold by Enka; Spectra, a trademark of Allied Signal for high modulus polyethylene; Monsanto Type AO2 nylon, a 6,6 nylon conforming to MIL C12369; polybenzamidazole; Vectra, liquid crystal p-hydroxybenzoic acid ester of Celanese; Technora, an arylamide of Teijin Co., containing 3,4'-diamino-diphenyl oxide plus terephthalic acid and p-phenylene diamine; esters of naphthalene diol and terephthalic acid and the like can also be used.

The preferred glass filaments are those spun from S-2 glass fiber available from the Owens-Corning Glass Co.

The scrim fibers are not narrowly critical and can be derived from various sources, as for example polyesters such as polyethylene terephthalate, commercially available from du Pont, polyolefins, such as polyethylene, polypropylene, aramids, such as Kevlar or Nomex (also available from du Pont), rayon, nylon, cellulose or non-woven glass. Depending on the cost and end-use application, a majority of these relatively inexpensive scrim materials are used in the fabrication of disposable diapers, disposable hospital attire and the like.

The preferred thermosetting resin is a phenol-formaldehyde/polyvinyl butyral composition comprising the following:

| | |
|---|---|
| Polyvinylbutyral solution | 868.0 parts by weight |
| Phenolic varnish | 100.0 parts by weight |
| Trimethylol phenol | 267.00 parts by weight |
| Phthalic anhydride | 5.6 parts by weight |
| Methanol | 51.2 parts by weight |

Other thermosetting resins which can be used include vinyl esters based on acrylate terminated bisphenol A, styrene crosslinked maleic acid esters, and the like.

When using woven fabric derived from one of the organic polymers enumerated above, it is preferred to use resin coated scrim impregnated with about 50-99% by weight of thermosetting resin. The degree of impregnation should be such that the final composition should contain about 15-20% of thermosetting resin based on the weight of organic polymer.

For glass-based woven fabric a higher amount of thermosetting resin is used in the scrim to afford about 20-30% based on the weight of organic polymer.

The weight % of thermosetting resin in the laminate can be determined by the following formula:

$$\frac{\text{Weight of laminate} - \text{Scrim weight}}{\text{Weight of laminate}} = \text{Weight \% of resin}$$

The data in Table 1 below delineates representative compositions.

TABLE 1

| Total Weight | Scrim Weight | Resin Weight | Resin Weight % |
|---|---|---|---|
| 2 | 1 | 1 | 50 |
| 3 | 1 | 2 | 66.7 |
| 4 | 1 | 3 | 75 |
| 5 | 1 | 4 | 80 |
| 6 | 1 | 5 | 83.3 |
| 10 | 1 | 9 | 90 |
| 15 | 1 | 14 | 93.3 |

The effect of even small amounts of scrim is demonstrated in the table above where, based on 1 oz. of scrim, the resin content is shown to rise to 93%. The ratio of resin to scrim ranges from 200 to 1400% versus scrim weight. This high ratio of resin to scrim is necessary for adjusting the resin content of the composite to a range of approximately 15-20%. If 1 oz. of resin per square yard of scrim is used with 16 oz./square yard of woven fabric, normally coated woven fabric requires approximately 4 oz. of dry resin for 20% resin content, so 400% resin or 4 oz. of dry resin must be coated on the scrim so that the resulting resin content is comparable to the coated Kevlar presently used. Therefore the 400% resin to scrim ratio would be 80% resin content for the scrim.

In order to fully exploit as well as understand this invention, it is necessary to differentiate between the resin content of the scrim from that of the interleaved composite or laminate. Scrim can vary from 0.5 oz./square yard to about 4 oz./square yard. However its effectiveness as a resin carrier with high resin content at low weight(0.2-0.4 oz./square yard) would be questionable because the resulting resin-coated scrim composition would be fragile. On the other hand high weight scrim (3 to 4 oz./square yard) would result in a higher weight of scrim being introduced into the final composite. The resulting Kevlar composite would be uneconomical even though improved ballistics can be obtained.

In the use of fabrics woven from aramid fibers it is de rigueur that the thermosetting resin remain at the interface of woven and non-woven fabrics. If it extends to any significant degree into the woven fiber domain, the resultant laminate will be unduly rigid without sufficient flexibility to retard penetration of a ballistic projectile. On the other hand it is desirable for fabrics woven from glass filaments that the resin extend into the fabric because the glass is brittle and is ineffective alone to prevent penetration of a ballistic projectile. It is known that resin coated glass, unlike the organic filaments, is more ballistically resistant than the glass alone.

As a variation on the theme, one can also employ fibers of the organic polymers delineated above in non-woven form by arranging them in layers in which the filaments are unidirectional within each layer but the layers are arranged alternately with each superimposed layer in a different orientation.

DESCRIPTION OF THE INVENTION

Figure 1:
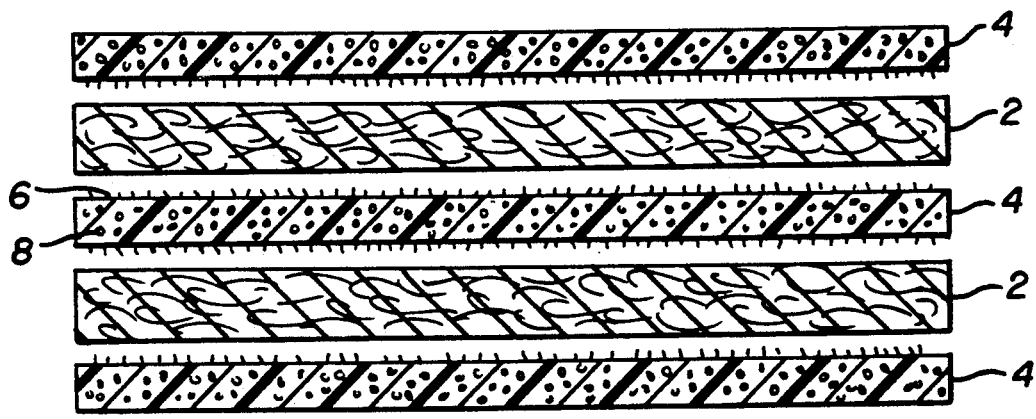
FIG. 1 is a cross-sectional view of the components of a laminate before bonding.

Although only two plies of woven fabric are used to demonstrate the invention in the drawings, any number can be used, interleafed with non-woven scrim prepreg depending on the degree of rigidity desired in the final bonded article. The outermost plies of woven fabric are covered with non-woven scrim prepreg to protect these surfaces from abrasion and attack by actinic radiation.

Conventional heated presses can be utilized for the bonding of the layers of woven fabric and non-woven scrim prepreg by compression molding. These are well known to those skilled in the art.

The ballistic resistance of the laminates of this invention was measured by $V_{50}$ ballistic values defined in MIL-STD-662E (incorporated herein by reference) in general as, the velocity at which the probability of penetration of an armor material is 50 percent. Conversely it may be described as the impacting velocity at which 50% of the projectiles are stopped as a measure of the protective power of an armor specimen.

Areal density is defined as a measure of the weight of armor material per unit area, usually expressed in pounds per square foot ($lb/ft^2$) or kilograms per square meter of surface area.

The invention is further described in the examples that follow. All parts and percentages are by weight unless otherwise specified.

EXAMPLE 1

Ballistic laminated target panels were fabricated from two woven Kevlar aramid materials. The first was a 2×2 basket weave fabric, 24 ends/inch—3000 denier in 24"×24" sections. The second was a 4×4 basketweave fabric, 21 ends/inch —3000 denier in 4"×4" sections.

Using the first material, 15 plies were interplied with 16 plies of Dacron non-woven scrim prepreg containing 80 weight % of the phenol-formaldehyde/polyvinyl butyral resin described above. The resultant panel was cured in a heated press at 171°-177° C. (340°-350° F.) under a pressure of 700 psi for one hour and then cooled to ambient temperature. The final thickness of the panel was 0.429"and the final areal density was 2.61 lbs. Samples for testing were water jet cut from the cured panels. Using the ballistic test for armor described in MIL-STD-662E a V-50 value of 1986 ft. per second was observed at a range of 116 ft. per second with a 30 calibre projectile and a 44 grain charge.

EXAMPLE 2

Example was repeated with the exception that 17 plies of the second Kevlar material was used for the woven fabric along with 18 plies of scrim prepreg. This small difference in the number of plies was used in order to keep the areal densities as close as possible. The final thickness of the panel was 0.437" and the final areal density was 2.587 lbs. The $V_{50}$ value was 1900 ft. per second at a range of 114 ft. per second with a 30 calibre projectile and a 44 grain charge.

CONTROL

When Example 1 was repeated but omitting the scrim prepreg but applying the same phenol-formaldehyde/-polyvinyl butyral directly to both surfaces of 17 plies of Kevlar woven fabric a panel having an areal density of 2.43 lbs. with a $V_{50}$ value of 1623 ft. per second was obtained with a 30 calibre projectile and a 44 grain charge. This CONTROL is representative of the state of the prior art. In addition to producing ballistic panels of lower protective power there is a greater waste of expensive Kevlar fabric using the prior art technique. It was unexpected that the use of a scrim prepreg not only provided a facile means for applying resin bonding agent to the woven fabric substrates but produced laminates with higher $V_{50}$ values than those produced by coating or applying the bonding agent directly to the substrate prior to compression molding. The latter method also suffers the disadvantage of wasting the trim from these expensive substrates. This fabric from the trim cannot be recycled because the resin adheres too tenaciously to the woven fabric substrate. In the practice of the instant invention, the desired number of plies of woven fabric interleafed with scrim prepreg are brought into contact and arranged for bonding into a particular article. Before subjecting this system to compression molding, it can be cut or trimmed to the approximate configuration of the final bonded article. The excess, trimmed woven fabric can be recovered for reuse inasmuch as the scrim prepreg is not adhered to it. In prior art methods, this trimmed woven fabric would have bonding resin adhered to it and could not be easily recovered for reuse.

This invention is particularly adaptable to the fabrication of body armor and military helmets as well as armor panels used for military vehicles, vessels and aircraft. Shaped articles may be formed during the curing cycle by judicious design of molds and other shaping equipment.

The invention is more clearly delineated in Table 2 which is presented below.

TABLE 2

| Example No. | Areal Density (lb/ft²) | Resin Content Wt. % | Kevlar Wt. % | Scrim Wt. % | $V_{50}$ |
| --- | --- | --- | --- | --- | --- |
| 1 | 2.610 | 17.74 | 77.8 | 4.43 | 1986 |
| 2 | 2.587 | 20.06 | 75.8 | 4.19 | 1900 |
| Control | 2.430 | 17.0 | 83.0 | 0.0 | 1623 |

It should be noted that a commparison of the data from Example 1 and the Control evinces improved $V_{50}$ ballistic values for the former with approximately the same Kevlar and resin content. Even with lower Kevlar content in Exammple 2, a superior $V_{50}$ value over that of the Control is obtained (1900 vs 1623)

EXAMPLE 3

Example 1 was repeated with the exception that ballistic samples in the 4.5–4.7 lb/square foot range were prepared. These specimens evinced V-50 values comparable to those of Example 1 and 2.

EXAMPLE 4

When example 1 is repeated except that fabric woven from Owens-Corning S-2 Glass fiber is substituted for the Kevlar material, laminates with comparable ballistic $V_{50}$ values are obtained. This glass is a low-alkali magnesium-alumina-silicate composition. The virgin S-2 Glass fiber filamnent properties include:

Density = 0.090 lbs/cu.in.
Tensile strength = 665K psi
Modulus of elasticity = 12.6 Msi
Ultimate elongation (@ 72° F./22.2° C.) = 5.4

The interleafing technique of this invention also provides a means for making hybrid panels or composites by bonding plies of Kevlar and woven fabrics of Spectra, carbon fibers or glass fibers with scrim prepreg. The preferred glass fiber is OwensCorning S-2 Glass fiber.

Other applications of this invention include the fabrication of light weight protection systems or kits, crashresistant helicopter armor seats, blankets for electronic equipment, curtains and liners for shipping containers and autos and the like.

Figure 2:
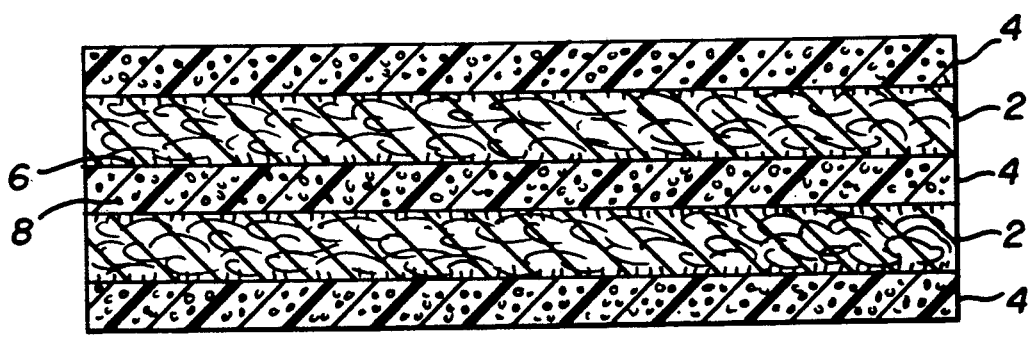
FIG. 2 is a cross-sectional view of the fabricated laminate.

The invention is further delineated in the figures. In FIG. 1, two plies of Kevlar 29 ballistic grade of woven fabric, 2, are separated by a ply of non-woven scrim prepreg, 4, containing a surface coating of phenol-formaldehyde/polyvinyl butyral resin, 6, as well as phenol-formaldehyde/polyvinyl butyral resin, 8, dispersed throughout said non-woven scrim prepreg, 4. Plies of non-woven scrim prepreg, 4, are also placed on the surface of woven fabric, 2. FIG. 2 shows the plies of woven fabric, 2, and the non-woven scrim prepreg, 4, after being compression bonded together through the cured resin, 6 and 8. Note that resin, 6, extends slightly into the domain of the woven fabric, 2, but not deep enough to render the woven fabric brittle.

Although the invention has been described with a certain degree of particularity, it will be understood by those skilled in the art that this was done only by way of example and that numerous changes and modifications may be made without departing from the spirit and scope of the invention.

What is claimed is:

1. A ballistic resistant laminate comprising alternating plies of woven fabric bonded to alternating plies of non-woven scrim prepreg through a heat curable resin in said prepreg wherein said fabric is woven from filaments of glass or at least one normally solid organic polymer having:
    (a) a tensile modulus of at least about 20 g/denier;
    (b) a tensile strength of at least about 400,000 psig; and
    (c) an areal density at least about 0.5 lb/ft² and said scrim comprises filaments of natural or synthetic fibers impregnated with a heat curable resin.
2. Laminate claimed in claim 1 wherein the organic polymer is an aramid.
3. Laminate claimed in claim 2 wherein the aramid is poly(p-phenylene terephthalamide).
4. Laminate claimed in claim 1 wherein the fabric is woven from filaments of S-2 Glass fiber.
5. Laminate claimed in claim 1 wherein the heat curable resin is a phenol-formaldehyde/polyvinyl butyral resin.
6. Laminate claimed in claim 1 wherein the heat curable resin constitutes about 15–20% by weight of the organic polymer.

7. Laminate claimed in claim 1 wherein the heat curable resin constitutes about 20–25% by weight of the S-2 Glass fiber.

8. Laminate claimed in claim 1 wherein the cured resin slightly penetrates the interface between the woven fabric and the non-woven scrim.

9. Laminate claimed in claimed 1 wherein the organic polymer is a high modulus polyethylene.

10. Laminate claimed in claim 1 wherein the organic polymer is nylon.

11. Laminate claimed in claim 1 wherein the non-woven scrim is a polyethylene terephthalate.

12. Method of fabricating a ballistic resistant laminate which comprises:
   (1) assembling alternating plies of fabric woven from glass or a normally solid organic polymer and non-woven scrim prepreg impregnated with a heat curable resin and
   (2) subjecting the assembly of (1) to conditions of heat and pressure sufficient to cure the resin and bond the alternating plies of woven fabric and non-woven scrim into an integral structure; wherein said polymer has:
   (a) a tensile modulus of at least about 20 g/denier;
   (b) a tensile strength of at least about 400,000 psig; and
   (c) an areal density at least about 0.5 lb/ft$^2$ and said scrim comprises filaments of natural or synthetic fibers impregnated with a heat curable resin.

13. Method claimed in claim 12 wherein the assembly of step (1) is shaped into a formed article during curing step (2).

14. Method claimed in claim 13 wherein the formed article is a military helmet.

15. Method claimed in claim 13 wherein the formed article is a panel of armor.

16. Method claimed in claim 12 wherein the organic polymer is an aramid.

17. Method claimed in claim 16 wherein the aramid is poly(p-phenylene terephthalamide).

18. Method claimed in claim 12 wherein the fabric is woven from filaments of S-2 Glass fiber.

19. Method claimed in claim 12 wherein the heat curable resin is a phenol-formaldehyde/polyvinyl butyral resin.

20. Method claimed in claim 12 wherein the heat curable resin constitutes about 15–20% by weight of the organic polymer.

21. Method claimed in claim 12 wherein the heat curable resin constitutes about 20–25% by weight of the S-2 Glass fiber.

22. Method claimed in claim 12 wherein the non-woven scrim is a polyethylene terephthalate.

* * * * *